(12) United States Patent
Scapozza (10) Patent No.: US 8,424,412 B2
(45) Date of Patent: Apr. 23, 2013

(54) STEERING COLUMN FOR MOTOR VEHICLE

(75) Inventor: Matteo Scapozza, Bellinzona (CH)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 475 days.

(21) Appl. No.: 12/659,993

(22) Filed: Mar. 26, 2010

(65) Prior Publication Data

US 2010/0186535 A1    Jul. 29, 2010

Related U.S. Application Data

(63) Continuation of application No. PCT/EP2008/008334, filed on Oct. 2, 2008.

(30) Foreign Application Priority Data

Oct. 8, 2007    (DE) .......................... 10 2007 048 208

(51) Int. Cl.
*B62D 1/00*    (2006.01)

(52) U.S. Cl.
USPC ............................................ 74/492; 260/777

(58) Field of Classification Search .................... 74/492, 74/493; 280/775, 777
See application file for complete search history.

(56) References Cited

U.S. PATENT DOCUMENTS

| 3,769,851 | A | | 11/1973 | Edme et al. | |
|---|---|---|---|---|---|
| 3,948,539 | A | * | 4/1976 | Murase et al. | 280/777 |
| 4,397,480 | A | * | 8/1983 | Ouchi | 280/777 |
| 4,627,306 | A | * | 12/1986 | Berenjian | 74/492 |
| 4,943,028 | A | * | 7/1990 | Hoffmann et al. | 248/548 |
| 5,722,299 | A | * | 3/1998 | Yamamoto et al. | 74/493 |
| 6,305,712 | B1 | * | 10/2001 | Hayashi | 280/777 |
| 6,322,103 | B1 | * | 11/2001 | Li et al. | 280/777 |
| 6,378,903 | B1 | | 4/2002 | Yabutsuka et al. | |

(Continued)

FOREIGN PATENT DOCUMENTS

| DE | 101 58 314 | 7/2002 |
|---|---|---|
| DE | 10 2006 020 650 | 8/2007 |

(Continued)

OTHER PUBLICATIONS

International Search Report issued Dec. 30, 2008 in International (PCT) Application No. PCT/EP2008/008334.

*Primary Examiner* — Justin Krause
*Assistant Examiner* — Gregory Prather
(74) *Attorney, Agent, or Firm* — Wenderoth, Lind & Ponack, L.L.P.

(57) ABSTRACT

A steering column for a motor vehicle includes a bracket unit bearing a steering spindle, and the unit is secured by means of securement bolts on a vehicle-stationary part. The securement bolts penetrate through elongated holes in the bracket unit or in the vehicle-stationary part, and the bracket unit in the event of a crash, is displaceable, starting from a starting position, with the displacement of the securement bolts in the elongated holes with respect to the vehicle-stationary part. Each elongated hole is disposed at least over a portion of its longitudinal extent in a retaining strip which, in the starting position of the bracket unit, includes a curvature, which, during a displacement of the bracket unit with respect to the vehicle-stationary part occurring in the event of a crash, is at least decreased through the cooperation with the securement bolt or a part disposed thereon.

20 Claims, 5 Drawing Sheets

U.S. PATENT DOCUMENTS

| | | | |
|---|---|---|---|
| 6,450,532 B1 * | 9/2002 | Ryne et al. | 280/777 |
| 6,454,302 B1 * | 9/2002 | Li et al. | 280/777 |
| 6,523,432 B1 | 2/2003 | Yamamoto et al. | |
| 7,311,333 B2 * | 12/2007 | Sato et al. | 280/777 |
| 7,434,839 B2 * | 10/2008 | Tokioka | 280/777 |
| 7,472,924 B2 * | 1/2009 | Ikegaya et al. | 280/777 |
| 7,780,196 B2 * | 8/2010 | Cymbal et al. | 280/777 |
| 8,220,834 B2 * | 7/2012 | Battistella et al. | 280/777 |
| 2005/0263997 A1 | 12/2005 | Tokioka | |

FOREIGN PATENT DOCUMENTS

| | | |
|---|---|---|
| EP | 0 479 455 | 4/1992 |
| EP | 1 600 355 | 11/2005 |
| JP | 11-29051 | 2/1999 |

* cited by examiner

STEERING COLUMN FOR MOTOR VEHICLE

This application is a continuation application of International application PCT/EP2008/008334, filed Oct. 2, 2008, the entire disclosure of which is incorporated herein by reference.

BACKGROUND OF THE INVENTION a) Field of the Invention

The invention relates to a steering column for a motor vehicle with a bracket unit bearing a steering spindle, which unit is secured in position on a vehicle-stationary part. The securement bolts penetrate through elongated holes in the bracket unit or in the vehicle-stationary part, and the bracket unit in the event of a crash, starting from a starting position, is displaceable in the elongated holes with respect to the vehicle-stationary part with the displacement of the securement bolts.

b) Description of Related Prior Art

Steering columns in which a bracket unit bearing the steering spindle is connected with a vehicle-stationary part, such that in the event of a crash a displacement of the bracket unit relative to the vehicle-stationary part is made possible, are known in various implementations. DE 10 2006 020 650 B3, for example discloses a steering column in which the bracket unit is implemented as a carriage guided by a vehicle-stationary mounting unit. The bracket unit includes grooves extending bilaterally to the steering spindle in the longitudinal direction, into which grooves extend projections of the mounting unit directed toward one another. For the energy absorption during the displacement of the bracket unit with respect to the mounting unit in the event of a crash, energy consuming means acting between the bracket unit and the shell unit are additionally provided.

EP 0479 455 A2 discloses a steering column in which a bracket unit bearing the steering spindle is connected with a vehicle-stationary part using securement bolts. The securement bolts penetrate elongated holes formed in the bracket unit, whereby displacement of the bracket unit with respect to the vehicle-stationary part is made possible in the event of a crash. Each of the elongated holes has herein an enlarged section which, in the starting position of the bracket unit, is penetrated by the securement bolt. In the remaining region the width of the elongated hole is smaller than the diameter of the securement bolt, whereby the energy absorption is attained during the displacement of the bracket unit in the event of a crash. Further steering columns in which load bearing bolts penetrate through elongated holes in a bracket unit and are displaced in them in the event of a crash are disclosed in U.S. Pat. No. 3,769,851 and U.S. Pat. No. 6,378,903 B1. Through the cooperation of the securement bolt with implementations of the elongated hole hindering its displacement in the elongated hole, an energy absorption takes place in each case. One disadvantage of these steering columns is the constructional length required for the implementation of the elongated holes.

Also known is that the securement of the bracket unit on a vehicle-stationary part by means of securement bolts takes place through holes or cutouts of the bracket unit, which are open toward the steering-wheel side margin of the steering column. In the event of a crash, the bracket unit can become detached from the vehicle-stationary part with the disadvantageous result that the driver-side section of the steering column falls onto the legs of the driver. This is especially disadvantageous in the case of steering columns with steering force boosting means integrated into the steering columns, which have a greater weight.

U.S. Pat. No. 6,523,432 B1 discloses a steering column in which the bracket unit is detachable from the vehicle-stationary part in the event of a crash. The shell tube rotatably supporting the steering spindle is provided at its steering-wheel remote end with a metal retaining sheet including an elongated hole through which a bolt penetrates for the displaceable securement of the shell tube on a vehicle-stationary part.

SUMMARY OF THE INVENTION

The invention addresses the problem of providing a steering column of the above described type, in which, in the event of a crash, the bracket unit can become displaced with respect to the vehicle-stationary part, without the complete detachment of the connection between the bracket unit and the vehicle-stationary part occurring, in which a compact construction is attained.

According to the invention this is attained with a steering column for a motor vehicle comprising a steering spindle, and a bracket unit bearing the steering spindle, which unit is secured in position by means of securement bolts on a vehicle-stationary part. The securement bolts penetrate through elongated holes in the bracket unit or in the vehicle-stationary part and, in the event of a crash, the bracket unit, starting from a starting position, with the displacement of the securement bolts is displaceable in the elongated holes with respect to the vehicle-stationary part. A particular elongated hole is disposed at least over a portion of its longitudinal extent in a retaining strip which, in the starting position of the bracket unit, includes a bend which, during a displacement of the bracket unit with respect to the vehicle-stationary part taking place in the event of a crash, is at least decreased through the cooperation with the securement bolt or a part disposed thereon.

By disposing elongated holes in curved retaining strips, a compact implementation of the steering column is made possible. In the event of a crash (=in the event of a vehicle crash) during a displacement of the bracket unit with respect to the vehicle-stationary part, the curvature of the retaining strips is at least decreased through the cooperation with the securement bolts or the parts, such as nuts or shim disks, disposed on the securement bolts, e.g., the curvature is decreased or eliminated. Stated differently, a particular retaining strip during the displacement therein of the securement bolt is partially or completely straightened.

In the starting position of the bracket unit, the retaining strips are advantageously bent over at least 45, preferably over at least 60, e.g., straight sections of the retaining strip bilaterally adjoining the curvature form with one another an angle of at least 45°, and preferably at least 60°. In an advantageous embodiment this angle is in the range of 80° to 100°.

In an advantageous embodiment of the invention, the retaining strips including the elongated holes are formed of separate parts, each of which is connected with another part of the bracket unit or of the vehicle-stationary part. They are preferably disposed, for example welded, onto a base part of the bracket unit.

The system can be implemented such that only low energy is absorbed through the displacement of the securement bolts in the elongated holes. For this purpose, the retaining strips can be formed comparatively thin, their thickness being less than a base part of the bracket unit on which each particular strip is attached. In this case, an additional energy absorption device can be provided in order to absorb energy during the displacement of the bracket unit with respect to the vehicle-stationary part. In this case, the energy absorption is substantially only determined by this additional energy absorption device. This permits precisely controlling the absorbed energy by means of a separate energy absorption device. Such energy absorption devices are known.

It is, on the other hand, also conceivable and feasible to implement the steering column according to the invention such that the (partial) straightening of the retaining strips during the displacement of the bracket unit with respect to the vehicle-stationary part and/or the displacement of the securement bolt in the elongated hole (for example thereby that this hole is widened through the securement bolt during the displacement) is drawn on for energy absorption.

The steering column according to the invention is preferably a steering column adjustable in length and/or inclination or height, e.g., the steering spindle and a bearing part rotatably bearing-supporting the spindle are adjustable with respect to the bracket unit in the longitudinal direction of the steering spindle and/or in inclination in the open state of a securement device.

The bracket unit is preferably connected using securement bolts in the proximity of its steering wheel-side end with the vehicle-stationary part.

Further advantages and details of the invention will be explained in the following in conjunction with the attached drawings,

DETAILED DESCRIPTION OF THE PREFERRED EMBODIMENTS

According to the embodiment of the invention depicted in the Figures, the steering column comprises a steering spindle 1 rotatably bearing-supported in a bearing part 2, on the steering wheel-side end 3 of which spindle is secured a steering wheel. The bearing part 2 comprises a shell tube 4 encompassing the steering spindle 1, and a retaining device secured on the shell tube 4, for example a U-profile member 5 welded onto it. Other implementations of the bearing part 2, which could overall also be denoted as shell tube or shell unit, are conceivable and feasible.

In the closed state of a securement member, the bearing part 2 is retained nondisplaceably with respect to a bracket unit 6. The bracket unit 6 bears the bearing part 2 and therewith the steering spindle 1.

In the depicted embodiment, the securement member is formed by a clamp bolt 8 tightly clampable by swiveling a clamp lever 7, which clamp bolt 8 penetrates intersecting elongated holes in side jaws 9, 10 of the bracket unit 6 and in the bearing part 2. In the closed state of the securement member, the side jaws 9, 10 of the bracket unit 6 are pressed onto the bearing part 2 (in the embodiment, onto the shanks of the U-profile member 5). In the open state of the securement member, the steering spindle 1, together with the bearing part 2 bearing-supporting it, for setting the steering column can be adjusted in the direction of the longitudinal axis 11 of the steering spindle 1, as well as in inclination with respect to the bracket unit 6. A length and inclination or height adjustment of the steering column can thereby be realized. Such devices for length and/or inclination or height adjustment and securement member for such are known. The securement in the closed state of the securement member can be attained in a known manner through friction closure, through form closure, or through a combination thereof. Securement member implemented in various ways are known from the prior art. The precise implementation of the securement member is not subject matter of the present invention.

Figure 1:
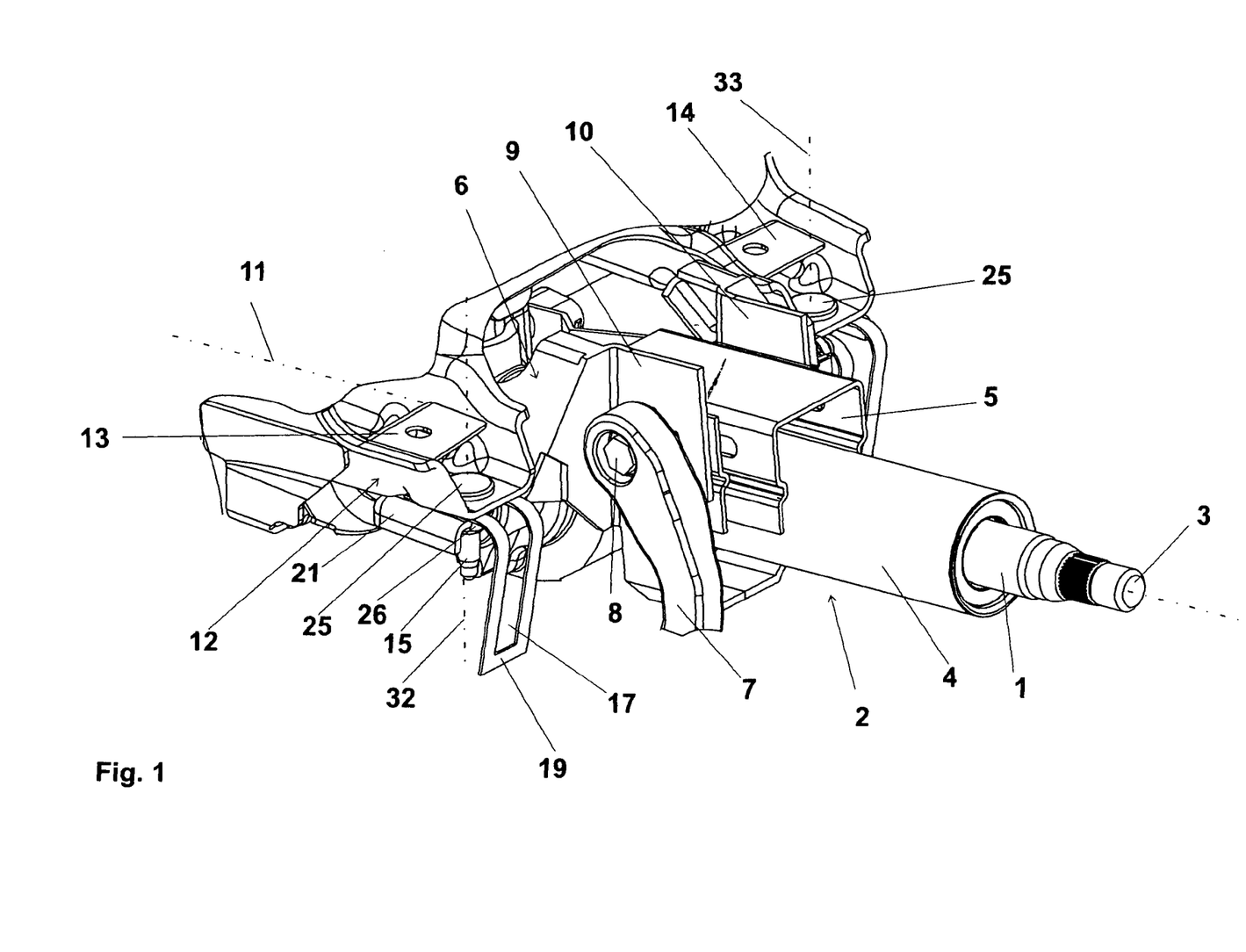
FIG. 1 shows a section adjoining the steering wheel-side end of a steering column in oblique view.
Figure 4:
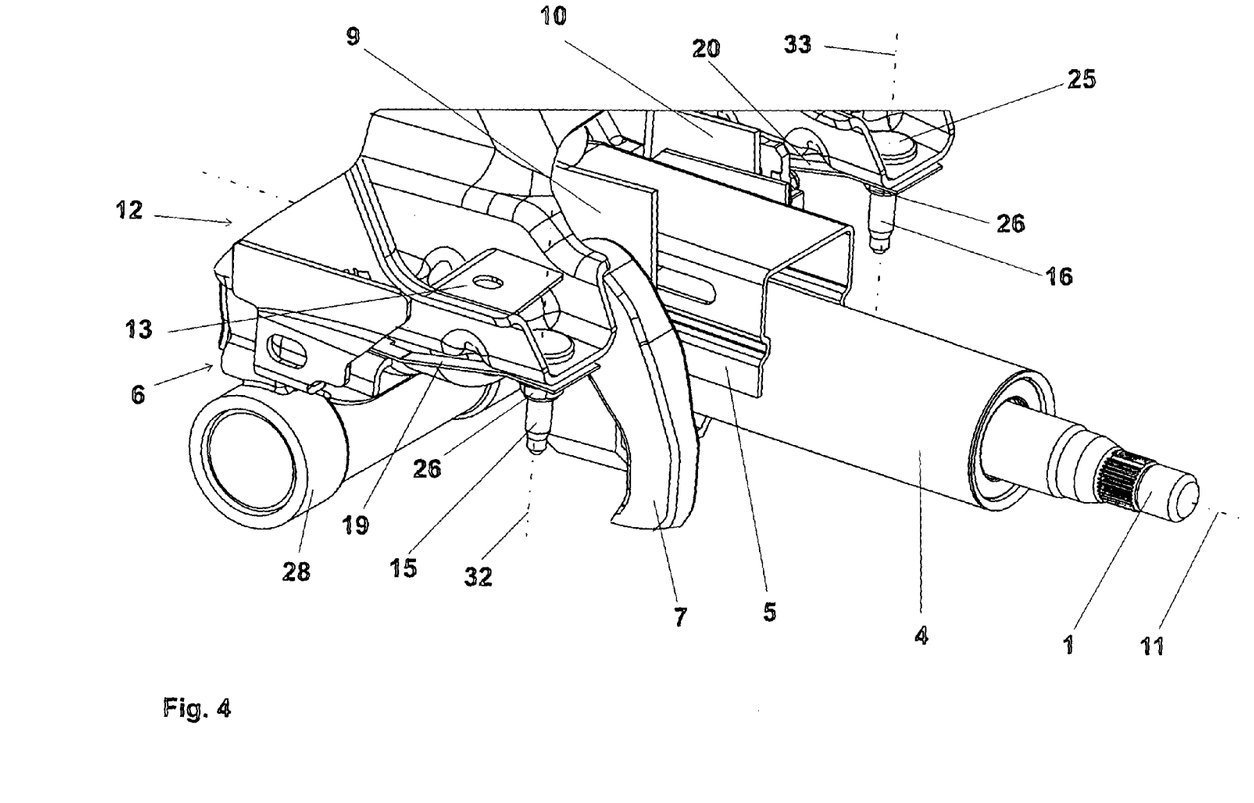
FIGS. 4 and 5 show the steering column in an oblique view from above and below in the state after a vehicle crash.

The bracket unit 6 is retained by a vehicle-stationary part 12. In the depicted embodiment, this part is formed by a cross member connected with the vehicle chassis. In FIGS. 1 and 4, securement plates 13, 14 are shown by example for the rigid securement of the vehicle-stationary part 12 on the vehicle chassis using threaded connections.

Securement bolts 15, 16 with longitudinal axes 32, 33 serve for connecting the bracket unit 6 with the vehicle-stationary part 12. Each of these bolts penetrates a bore in the vehicle-stationary part 12 and an elongated hole 17, 18 in the bracket unit 6. The elongated holes 17, 18 are herein disposed in retaining strips 19, 20 which are secured, for example by welding, with a rearward end (=an end facing away from the vehicle-side end of the steering spindle 1) (i.e., a base end) on a base part 21 of the bracket unit 6. In the proximity of this end secured on the base part 21, a section of the elongated hole 17, 18 of the retaining strip 19, 20 overlaps an opening or cutout 22, 23 of the base part 21, which opening or cutout is open toward the steering wheel-side margin of the base part 21.

Figure 2:
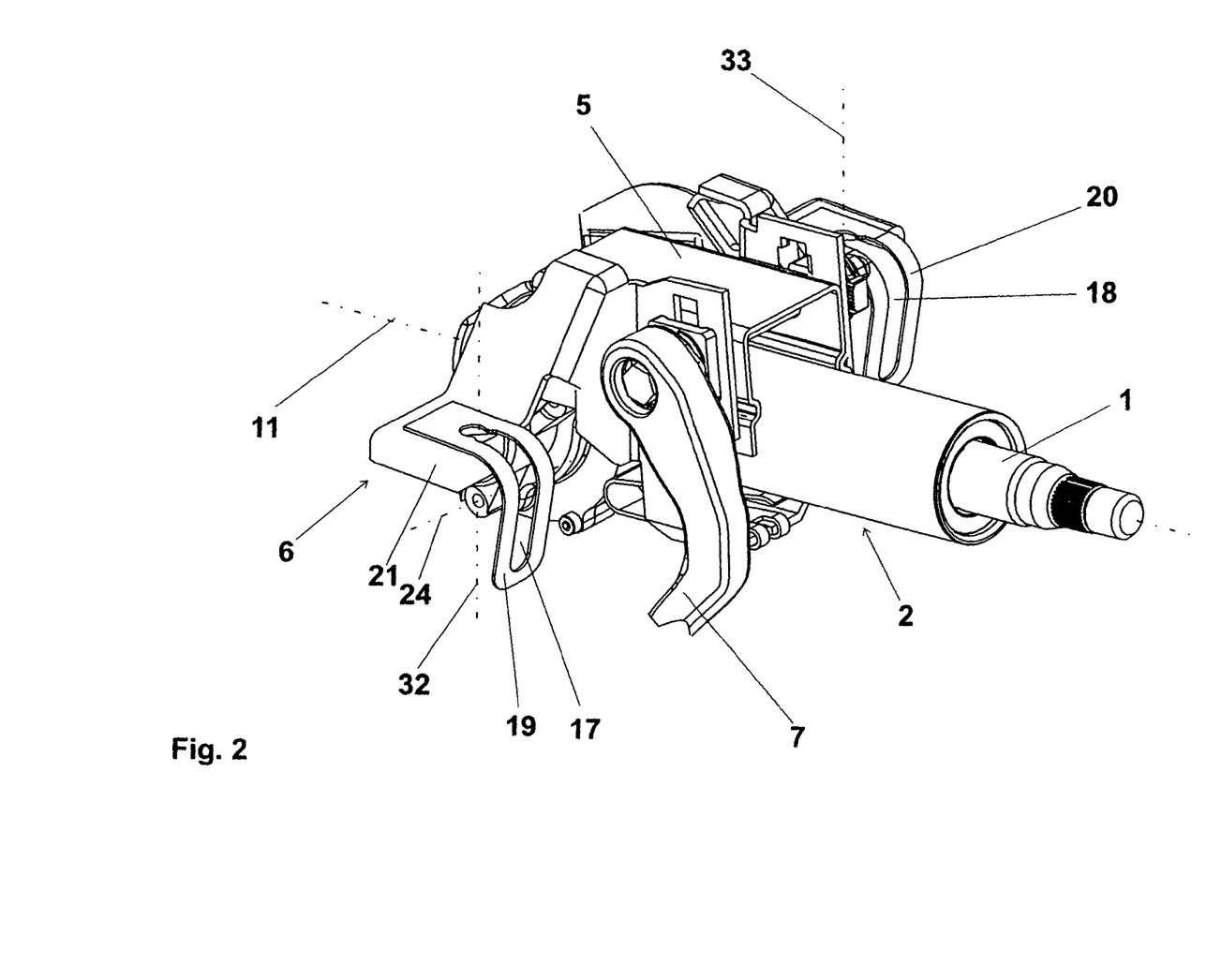
FIG. 2 shows the steering column of FIG. 1 without the vehicle-stationary part and the securement bolts.
Figure 3:
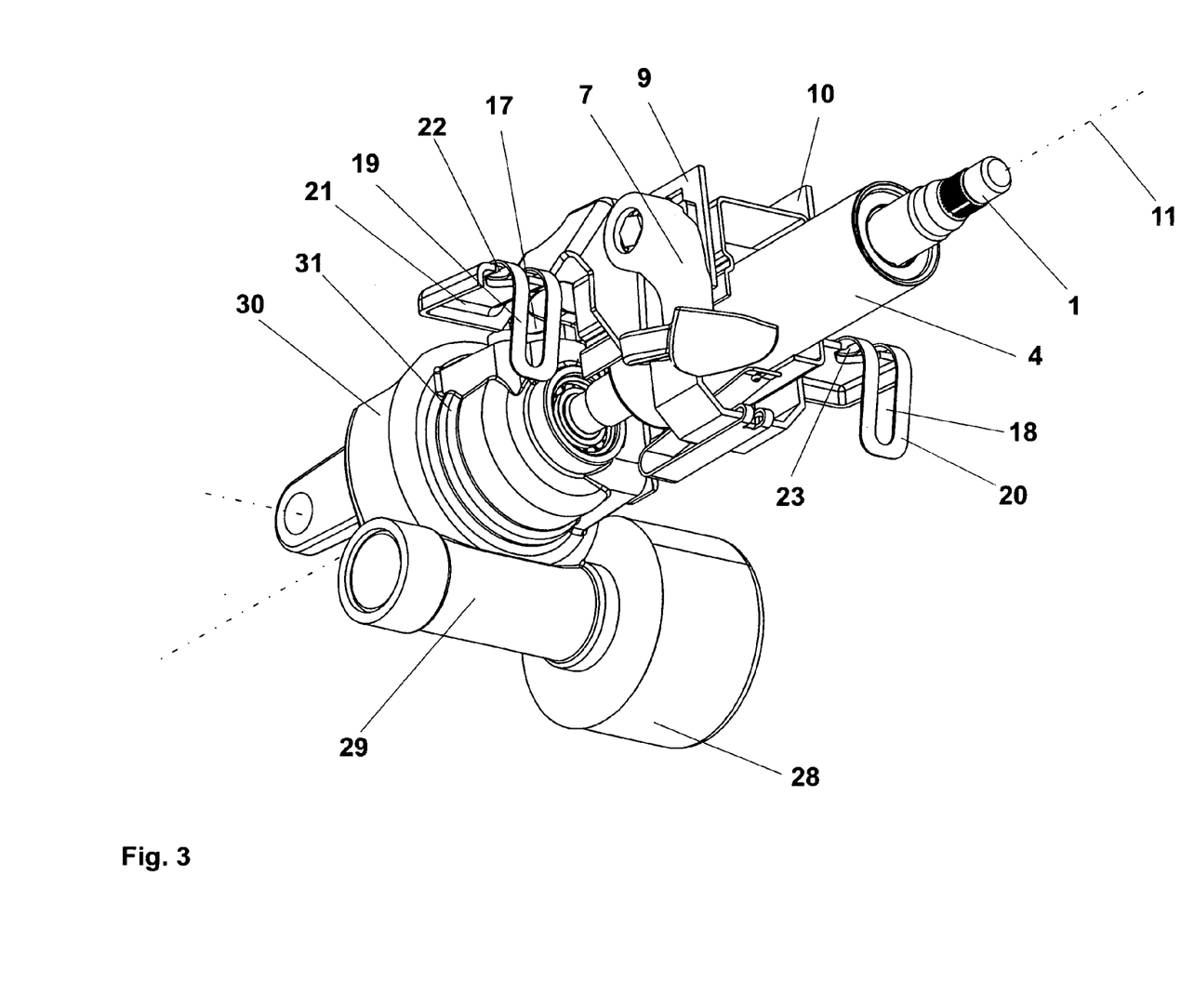
FIG. 3 shows a depiction of the steering column without the vehicle-stationary part and the securement bolts in an oblique view from below.

In the starting position of the bracket unit (=if no vehicle crash has occurred), the retaining strips 19, 20 and the elongated holes 17, 18 disposed therein have a curved course. The axis 24 of the curvature indicated in FIG. 2 is located at right angles to the longitudinal axis 11 of the steering spindle and horizontally or at right angles with respect to the longitudinal axis 32, 33 of the securement bolt 15, 16 (before a crash event). Starting from a non-curved retaining strip 19, the curvature occurs about the axis 24, located parallel to the plane of the retaining strip 19 or in the plane of the cutout 22, 23 on the bracket unit 6 and at right angles to the longitudinal extent of the retaining strip 19, 20.

In the mounted state of the steering column, the free end of each retaining strip is directed downwardly, preferably in an angular range of plus/minus 45 with respect to the longitudinal axis of the particular securement bolt 15, 16. An implementation in which the free end of each particular retaining strip is directed upwardly, preferably in the previously stated angular range, is also conceivable and feasible.

Adjoining the curved region, the particular retaining strip 19, 20 includes at its end, secured on the bracket unit 6, as well as also toward its free end a noncurved section, e.g., a section lying in one plane. The elongated hole 17, 18 extends over the curved section and over portions of the noncurved sections adjoining thereon.

Each particular retaining strip 19, 20 has in the depicted embodiment a lower rigidity than the base part 21. As depicted, for this purpose it is preferably comprised of a thinner metal sheet than the base part 21.

In the starting position of the bracket unit 6, each securement bolt 15, 16 extends through the cutout 22, 23 of base part 21 and through the section of the elongated hole 17, 18 overlapped by this base part. The vehicle-stationary part 12 and the bracket unit 6 are located between a head 25 of the particular securement bolt 15, 16 and a shim disk 27 secured by a nut 26.

Figure 5:
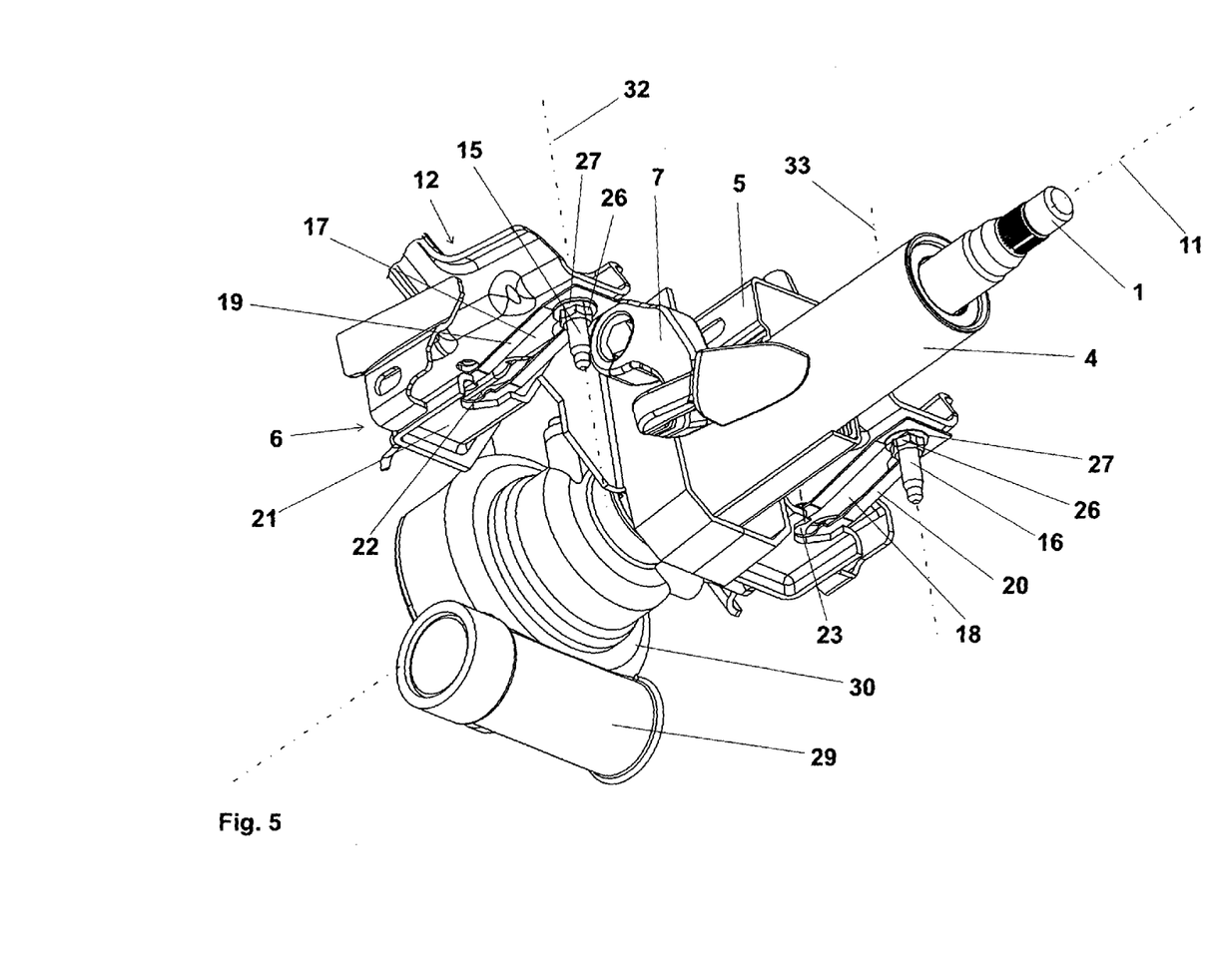

In the event of a vehicle crash, a displacement of the bracket unit 6 with respect to the vehicle-stationary part 12 can occur, with the bracket unit 6 moving in the direction toward the vehicle front. The securement bolts 15, 16 herein come out of engagement with the cutouts 22, 23 in the base part 21 and are displaced along the elongated holes 17, 18 in the retaining strips 19, 20. As a result, the curvature of each of the retaining strips 19, 20 is significantly reduced following the crash (see FIGS. 4 and 5). The retaining strips 19, 20 are herein substantially straightened through the cooperation with the shim disks 27 disposed on the securement bolts 15, 16. Following the crash, the bracket unit 6 continues to be appended on (suspended on) the vehicle-stationary part 12 via the retaining strips 19, 20, as is also evident in FIGS. 4 and 5. While a certain lowering of the bracket unit 6 may occur, this is however preferably less than one half of the displacement path in the direction of the longitudinal axis 11 of the steering spindle 1.

In the starting position, the bracket unit 6 and the vehicle-stationary part 12 are preferably tightly clamped with one another via the securement bolts 15, 16. Thereby, a breakaway force for the start of a displacement of the bracket unit 6 with respect to the vehicle-stationary part 12 is also defined. After the securement bolts 15, 16 have left the region of the cutouts 22, 23, the further force applied by the retaining strips 19, 20 against a displacement can be comparatively low.

It would, on the other hand, also be conceivable and feasible to design for a significant energy absorption during the displacement of the securement bolts 15, 16 through the elongated holes 17, 18 of the retaining strips 19, 20. Such could be effected in particular through the curvature of the retaining strips 19, 20 and/or through a cooperation of the securement bolts 15, 16 with the margins of the elongated holes 17, 18.

The depicted steering column has an electric steering force booster, wherein an electric motor 28 is connected with a gearing 31 via a worm 29 and a worm gear 30 for the introduction of the auxiliary force.

The invention can also be employed in steering columns without a steering force booster.

On each particular securement bolt 15, 16 additional parts, for example shim disks 27, can also be disposed. A reverse configuration can also be provided, in which the head 25 or a subjacently disposed shim disk cooperates with the retaining strips 19, 20, and the nut 26 is disposed on the side of the vehicle-stationary part 12. Instead of a head 25, nuts can also be provided on both sides.

The vehicle-stationary part 12 could also be a further mounting part of the steering column, which is secured in position on the cross member or on another part of the vehicle chassis.

The retaining strips 19, 20 are preferably comprised of metal. The base part 21 is preferably comprised of metal.

The invention could also be employed in connection with non-adjustable steering columns. A "kinematic reversal" of the embodiment depicted in the Figures is also conceivable and feasible. The retaining strips 19, 20 could in this case be attached on a base part of the vehicle-stationary part 12, starting from which they would extend in this case in a direction directed away from the steering wheel-side end 3 of the steering spindle 1. The base part of the vehicle-stationary part could include openings open toward its steering wheel-remote end, through which in the starting state securement bolts 15, 16 penetrate in order to tightly clamp in the starting state the bracket unit 6 with the vehicle-stationary part 12.

It would also be conceivable and feasible for each particular elongated hole to be secured in position over a section of its extent in the retaining strip, and over its remaining extent to extend in the part on which the retaining strip is secured.

LEGEND TO THE REFERENCE NUMBERS

1 Steering spindle
2 Bearing part
3 Steering wheel-side end
4 Shell tube
5 U-profile
6 Bracket unit
7 Clamp lever
8 Clamp bolt
9 Side jaw
10 Side jaw
11 Longitudinal axis
12 Vehicle-stationary part
13 Securement plate
14 Securement plate
15 Securement bolt
16 Securement bolt
17 Elongated hole
18 Elongated hole
19 Retaining strip
20 Retaining strip
21 Base part
22 Cutout
23 Cutout
24 Axis
25 Head
26 Nut
27 Shim disk
28 Electric motor
29 Worm
30 Worm gear
31 Gearing
32 Longitudinal axis
33 Longitudinal axis

The invention claimed is:

1. A steering column for a motor vehicle comprising:
a steering spindle;
a bracket unit bearing said steering spindle, said bracket unit being secured on a vehicle-stationary part by securement bolts; and
a plurality of curved retaining strips each having a longitudinal axis and an elongated hole extending along said longitudinal axis, each of said retaining strips having a free end and a base end opposite said free end and secured to one of said bracket unit and the vehicle-stationary part;
wherein each of said securement bolts penetrate through said elongated hole of a respective one of said retaining strips while securing said bracket unit to the vehicle-stationary part, said bracket unit being displaceable relative to the vehicle-stationary part via displacement of said securement bolts through said elongated hole of each respective one of said retaining strips in the event of a crash;
wherein said free end of each of said curved retaining strips is directed upwardly or downwardly such that a curvature of each of said retaining strips is within a range of plus 45° to minus 45° with respect to a longitudinal axis of a respective one of said securement bolts; and
wherein said bracket unit, said curved retaining strips, and said securement bolts are configured such that said curvature of each of said retaining strips is decreased by displacement of said securement bolts through said elongated hole of each of said retaining strips in the event of a crash.

2. The steering column of claim 1, wherein each of said retaining strips is curved so that an angle between said free end and said base end is at least 45°.

3. The steering column of claim 2, wherein each of said retaining strips is curved so that an angle between said free end and said base end is at least 60°.

4. The steering column of claim 3, wherein each of said retaining strips is curved so that an angle between said free end and said base end is in a range of 80° to 100°.

5. The steering column of claim 1, wherein each of said retaining strips is curved about an axis oriented parallel to a plane of non-curved sections of each of said retaining strips and at a right angle to a longitudinal axis of each of said retaining strips.

6. The steering column of claim 1, wherein each of said retaining strips is curved about an axis oriented at a right angle to the longitudinal axis of said steering spindle and at a right angle to the longitudinal axis of each of said securement bolts.

7. The steering column of claim 1, wherein said bracket unit includes said retaining strips.

8. The steering column of claim 1, wherein each of said retaining strips is formed of separate parts, a first end of said parts being secured on a part of said bracket unit or a part of the vehicle-stationary part, and a second end of said parts being free.

9. The steering column of claim 8, wherein a thickness of said part of said bracket unit is greater than a thickness of a respective one of said retaining strips.

10. The steering column of claim 8, wherein each of said retaining strips has a non-curved free end section adjoining a curved section, said non-curved free end section lying in a single plane.

11. The steering column of claim 8, wherein said free end of each of said curved retaining strips is directed downwardly.

12. The steering column of claim 8, wherein each of said securement bolts penetrates through a cutout in a base part of said bracket unit, said base end of each of said retaining strips being secured to said base part, said cutout being open toward a steering wheel-side margin of said base part and overlapping with a section of said elongated hole of a respective one of said retaining strips.

13. The steering column of claim 1, further comprising a securement member configured to be movable between a closed state and an open state, wherein at least one of an inclination and a longitudinal position of said steering spindle with respect to said bracket unit is adjustable in the open state of said securement member.

14. The steering column of claim 13, wherein said securement member is disposed in proximity of said bracket unit.

15. The steering column of claim 14, wherein said securement member comprises a clamp bolt penetrating said bracket unit.

16. The steering column of claim 1, wherein a steering wheel-side end of said bracket unit is connected to the vehicle-stationary part via said securement bolts.

17. The steering column of claim 1, wherein said bracket unit, said curved retaining strips, and said securement bolts are configured such that said bracket unit will remain suspended on the vehicle-stationary part via said retaining strips and said securement bolts after the event of a crash.

18. The steering column of claim 1, wherein said bracket unit, said curved retaining strips, and said securement bolts are configured such that said retaining strips are substantially straightened by displacement of said securement bolts through said elongated hole of each of said retaining strips in the event of a crash.

19. The steering column of claim 1, wherein said base end of each of said retaining strips is welded to said bracket unit.

20. The steering column of claim 1, wherein said elongated hole extends from said base end to said free end along said longitudinal axis of each of said retaining strips.

* * * * *